(12) United States Patent
Puehse et al.

(10) Patent No.: US 12,260,410 B2
(45) Date of Patent: Mar. 25, 2025

(54) METHOD AND SYSTEM FOR BIOMETRIC PAYMENTS

(71) Applicant: MASTERCARD ASIA/PACIFIC PTE. LTD., Singapore (SG)

(72) Inventors: Tobias Puehse, Merlot Ville (SG); Abhinava Srivastava, Singapore (SG); Michihiko Yoden, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 128 days.

(21) Appl. No.: 17/834,683

(22) Filed: Jun. 7, 2022

(65) Prior Publication Data
US 2022/0398595 A1 Dec. 15, 2022

(51) Int. Cl.
*G06Q 20/40* (2012.01)
*G06Q 20/08* (2012.01)

(52) U.S. Cl.
CPC ... *G06Q 20/40145* (2013.01); *G06Q 20/0855* (2013.01)

(58) Field of Classification Search
None
See application file for complete search history.

(56) References Cited

U.S. PATENT DOCUMENTS

2019/0385160 A1* 12/2019 Safak ............... G06Q 20/3829

* cited by examiner

*Primary Examiner* — Scott S Trotter
*Assistant Examiner* — Amit Patel
(74) *Attorney, Agent, or Firm* — LOZA & LOZA, LLP (57) ABSTRACT

A method for biometric payments comprises: receiving biometric data obtained by a biometric reader device from a user who is registered for biometric payments with a merchant; determining a biometric identifier that is associated with the biometric data; determining a stored payment credential that is associated with the biometric identifier, wherein the stored payment credential is not stored by the merchant; determining a payment card number or payment token based on the stored payment credential; and generating an authorisation request message for processing by an issuer, wherein the authorisation request message comprises the payment card number or payment token, and a data element comprising an indication that the user was authenticated by a biometric authentication method.

11 Claims, 8 Drawing Sheets

METHOD AND SYSTEM FOR BIOMETRIC PAYMENTS

CROSS-REFERENCE TO RELATED APPLICATIONS

The present application for Patents claims priority to Singapore Patent Application number 10202106206X, filed Jun. 10, 2021, and which is incorporated by reference hereto, and which also assigned to assignee hereof.

TECHNICAL FIELD

The present disclosure relates to methods and systems for biometric payments.

BACKGROUND

Electronic card-based payments have traditionally involved the presentation of a physical card at a point-of-sale (POS) terminal. In this type of transaction, the card is read by a card reader of the POS terminal, such as a magnetic stripe reader, a chip reader, or a near field communications (NFC) reader that is configured for use in contactless payments. The information read from the card is used to form a transaction authorisation request that is transmitted to the issuer of the card for approval.

An alternative form of electronic payment is an online or "card not present" transaction, in which an e-commerce merchant accepts payment card credentials (including the primary account number, PAN; and other details such as card expiry date) via user input in a web browser or mobile application, and uses those payment card credentials to form the transaction authorisation request. In some cases, for the convenience of users, payment credentials used in a transaction may be stored by the e-commerce merchant for use in subsequent transactions by the same user. This is termed "card-on-file".

More recently, further alternative forms of payment have been developed to provide greater convenience and security to users. One such form of payment makes use of biometric data, for example derived from a facial scan of the user, to enable the user to make an in-store payment without presenting their card. Typically, this form of payment requires a card-on-file configuration, in which the merchant stores the user's payment credentials in association with stored biometric data of the user. The stored biometric data is matched against a biometric scan at the time of a transaction so that the associated payment credentials can be retrieved for the transaction.

While the above-described biometric payment is certainly more convenient for the user than conventional card-based payments, and arguably more secure in that the card is not exposed to e.g. a cashier (such that the PAN is not revealed and cannot be copied for fraud purposes), it does present its own security risks. If the merchant system is compromised, both payment credentials and biometric data may be exposed. Merchants are therefore subject to a high compliance burden to minimise liability for fraud and/or data privacy breaches. This requires significant investment in secure hardware and data security processes, putting biometric payment acceptance out of reach for many merchants.

Another difficulty is that a consumer who is registered for biometric payments may not be able to readily control when merchants are able to use biometrics as identifying credentials. For example, because facial payments are initiated passively (rather than the consumer needing to take positive action such as presenting a card), there is a risk that a payment can be initiated, intentionally or otherwise, without the consumer's knowledge. A consumer may therefore wish to use facial payments with a particular merchant for a certain period of time, but then revoke the merchant's permission to use the consumer's biometric data once that period expires. There is presently no easy way for consumers to do this.

It would be desirable to overcome or alleviate the above difficulties, or at least to provide a useful alternative.

SUMMARY

The present disclosure relates to a method for biometric payments, comprising:
  receiving biometric data obtained by a biometric reader device from a user who is registered for biometric payments with a merchant;
  determining a biometric identifier that is associated with the biometric data;
  determining a stored payment credential that is associated with the biometric identifier, wherein the stored payment credential is stored by a credential manager that is in communication with the merchant;
  determining a payment number based on the stored payment credential; and
  generating an authorisation request message for processing by an issuer, wherein the authorisation request message comprises the payment number, and a data element comprising an indication that the user was authenticated by a biometric authentication method.

The payment number may be, for example, a payment card number (e.g. a primary account number. PAN), or a tokenised payment card number (also referred to herein as a payment token).

In some embodiments, the biometric data is facial scan data.

The stored payment credential may be a secure remote commerce (SRC) profile identifier.

In some embodiments, determining the payment number comprises: transmitting a request to an SRC system based on the SRC profile identifier; receiving a response comprising an identifier of a default card of an SRC profile associated with the SRC profile identifier; and retrieving, from the SRC system, card data for the default card, and an indication as to whether the default card is enabled for biometric payments with the merchant.

In some embodiments, the data element is injected in an SRC payload prior to generating the authorisation request message.

Some embodiments of the method comprise enrolling a biometric authentication system associated with the biometric reader device.

In some embodiments, the biometric authentication system is enrolled responsive to a determination that the biometric authentication system complies with one or more requirements of a biometric authentication standard.

Some embodiments comprise storing an association of the biometric authentication system with the merchant.

The method may comprise validating a format of the biometric identifier; and terminating the biometric payment if the format is not successfully validated.

Some embodiments may comprise receiving a user request to enable or disable a payment number for biometric payments; and selectively enabling or disabling the payment number responsive to the user request. Said selective enabling or disabling may be for one or more specific merchants.

In some embodiments, if the payment number is disabled, biometric data of the user is deleted.

The present disclosure also relates to a method for biometric payments, comprising:

receiving, at a credential store from a merchant, a request to perform a biometric payment, the request comprising a biometric identifier of a user;

determining, at the credential store, a stored payment credential that is associated with the biometric identifier, wherein the stored payment credential is stored by a credential manager in communication with the merchant;

transmitting, to a biometric orchestration system, the stored payment credential, to cause the biometric orchestration system to determine one or more respective indicators of respective payment numbers associated with the payment identifier;

receiving, from the biometric authentication system, the one or more respective indicators;

if more than one indicator is received, selecting an indicator from the one or more respective indicators, and determining a corresponding payment number based on the selected indicator;

generating an authorisation request message for processing by an issuer, wherein the authorisation request message comprises the determined payment number, and a data element comprising an indication that the user was authenticated by a biometric authentication method.

The payment number may be a payment card number or payment token.

In some embodiments, the biometric data is facial scan data.

The stored payment credential may be an SRC profile identifier.

In some embodiments, determining the payment number comprises: transmitting a request to an SRC system based on the SRC profile identifier; receiving a response comprising an identifier of a default card of an SRC profile associated with the SRC profile identifier; and retrieving, from the SRC system, card data for the default card, and an indication as to whether the default card is enabled for biometric payments with the merchant.

Some embodiments may comprise requesting an issuer of the determined payment number to initiate a multifactor authentication process.

Some embodiments may comprise receiving a user request to disable a payment number for biometric payments; and selectively deleting biometric data of the user from the credential store responsive to the request.

In some embodiments, if the request is for one or more specific merchants, the biometric data is deleted only for the one or more specific merchants.

The present disclosure further relates to a system for biometric payments, comprising:

memory; and at least one processor;

wherein the memory stores instructions for causing the at least one processor to perform a method as disclosed herein.

BRIEF DESCRIPTION OF THE DRAWINGS

Embodiments will now be described, by way of non-limiting example, with reference to the drawings in which.

DETAILED DESCRIPTION

Figure 1:
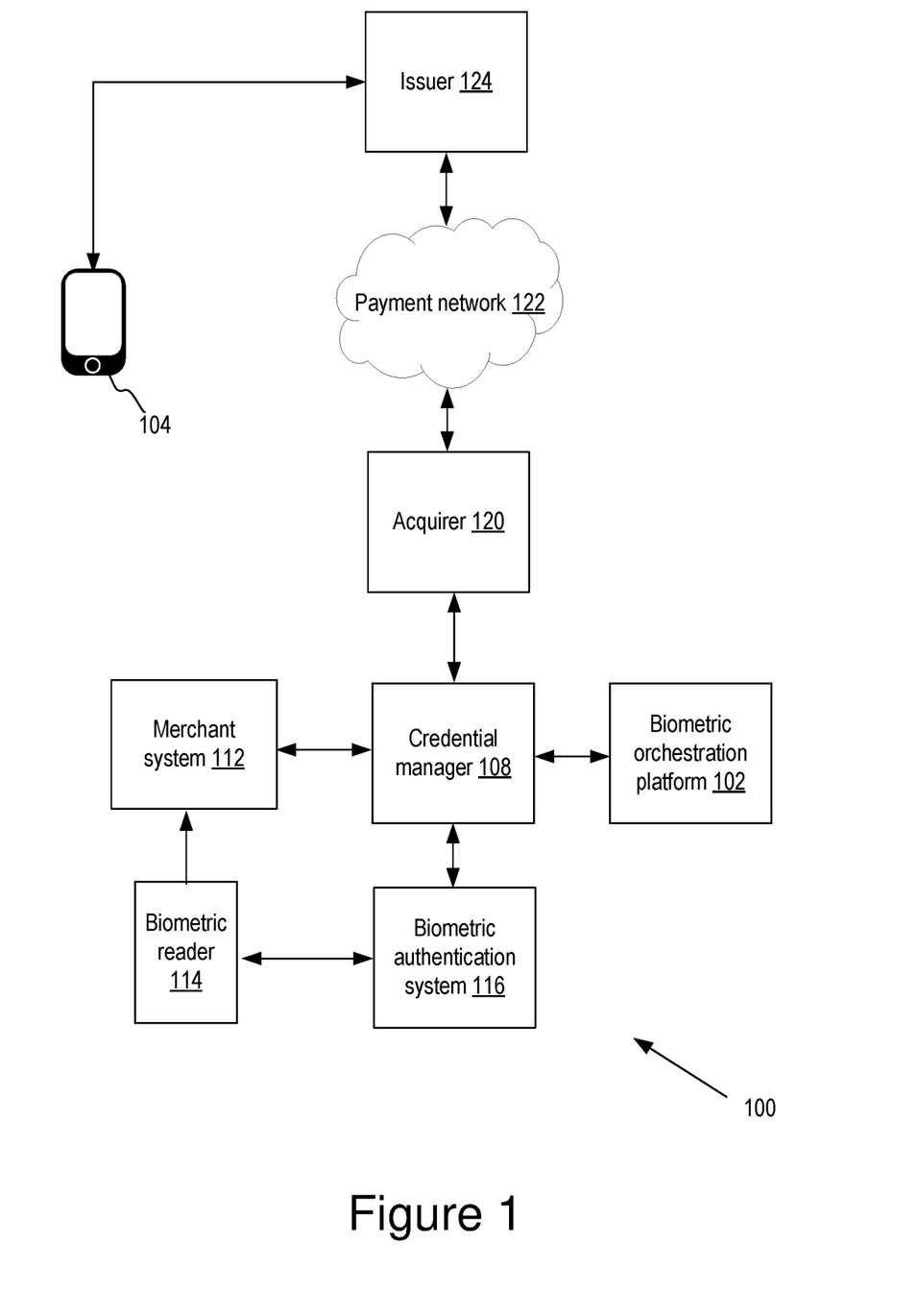
FIG. 1 is a block diagram of an example biometric payment system.

FIG. 1 is a high-level block diagram of a biometric payment system 100 according to some embodiments of the present invention. In particular, the system 100 includes a number of components that interact as described herein to allow transactions to be completed. The system according to embodiments of the invention associates a biometric identifier with payment information at a secure credential manager system that is remote from, and operated by a different entity than, a merchant system at which consumers initiate transactions using biometric reader equipment. The biometric identifier may be incorporated in transaction messaging flows, such as standard ISO 8583 or ISO 20022 messages. Issuers may thus enable consumers to exercise greater control over when, and by which merchants, biometric-based payments may be initiated, for example by implementing transaction processing rules that are applied to transaction messages.

In some embodiments, the system 100 enables biometric payments in a secure remote commerce (SRC) framework, as will be described in further detail below. Reference is made to the following documents:

(1) EMV Secure Remote Commerce Technical Framework (version 1.0, October 2017); and (2) EMV Secure Remote Commerce Specification (version 1.0, May 2019).

Each of documents (1) and (2) is available from www.emvco.com, and the disclosure of each is hereby incorporated by reference in its entirety as if fully set forth herein.

The biometric payment system 100 comprises a biometric orchestration platform 102 that generally operates to coordinate other system participants, such as consumers, merchants, biometric authentication service providers that perform biometric authentication (such as facial recognition, iris recognition, vein recognition, or fingerprint recognition) on behalf of merchants for initiating transactions, and issuers. The biometric orchestration platform 102 provides a common framework which allows a trusted ecosystem under which participants can play their respective roles while the biometric orchestration platform 102 acts as a coordinator enabling these entities to exchange transactional information in a pre-defined, secure format.

In particular, the biometric orchestration platform 102 may store data relating to identifiers of merchants 112 and credential managers 108 that are authorised to submit transactions for approval by issuers 124, as well as data relating to associations between merchants 112 and credential managers 108.

System 100 also comprises a biometric authentication system 116, such as a facial recognition system, which provides biometric authentication services to a merchant 112 via one or more dedicated biometric reader devices 114 that communicate with the biometric authentication system 116 and with the merchant system 112. A biometric reader device 114 provides an interface for a consumer to register their biometric template, such as a facial template, iris template, fingerprint template, and the like, as a biometric credential that is associated with, and can be used in place of, a payment credential. The payment credential may be, or may include, a payment number such as a payment card number (a primary account number, PAN), a tokenised payment card number, or another payment-related identifier that is not a card number or token representative of a card number, such as a secure remote commerce (SRC) profile ID. Registration causes the generation of a biometric identifier, which is stored in association with the biometric template by biometric authentication system 116. Further, the biometric identifier is stored in association with the payment credential, and a merchant identifier of the merchant, by a credential manager 108 that is in communication with the biometric authentication system 116.

Accordingly, once the consumer has been registered, and wishes to use biometric payments, such as facial payments, with the same merchant, biometric authentication system 116 is able to retrieve the biometric identifier based on a biometric scan (such as a facial scan) of the consumer, and in turn, the credential manager 108 is able to retrieve the payment credential (such as the tokenised payment card number or SRC profile ID) to initiate a transaction on behalf of the merchant. In this sense, the credential manager 108 may act as a payment service provider (PSP) for the merchant, or may communicate with the merchant's PSP to initiate the transaction. Alternatively, the credential manager 108 may be an SRC initiator (SRCI) in a SRC framework.

If a payment credential that is a payment number, such as a payment card number or tokenised payment card number, is obtained, it may be submitted directly by the credential manager 108 or PSP in a transaction authorisation request that is sent via an ISO 8583 or ISO 20022 message to issuer 124 for approval, via the merchant's acquirer 120 and payment network 124, in conventional fashion. Where the payment credential is not a payment number, for example an SRC profile ID, it may be used to retrieve a list of one or more linked payment numbers, such as payment card numbers or payment tokens associated with cards that are associated with the consumer's SRC profile, and to select one of the linked payment numbers for use in the transaction authorisation request.

The credential manager 108 generally operates to manage associations between payment card numbers, card tokens that are tokenised versions of the payment card numbers, and the biometric identifier that is generated by the facial recognition system 116. Credential manager 108 may also operate as, or be in communication with, a token service provider. The credential manager 108 may also therefore be responsible for managing the card token lifecycle. Credential manager 108 may provide the capability to help consumers opt-out of the use of biometric payments, and may also provide an option for users to manage the association of their payment cards with their biometric credential. In some embodiments, the credential manager 108 may be operated by the same entity as biometric authentication system 116.

The biometric orchestration system 102 may maintain user profiles that indicate whether a given payment credential of a user is permitted for use with biometric payments with particular merchants. Biometric orchestration system 102 may further communicate any changes in permissions to the credential manager 108. In some embodiments, users may be able to communicate directly with biometric orchestration system 102 to modify their biometric payment permissions.

In some embodiments, the biometric orchestration platform 102 may comprise a SRC system that generally operates to orchestrate messages and transactions between transaction participants. In some embodiments, a number of SRC systems 102 may be in the system 100. Each of the SRC systems 102 may be operated by or on behalf of different entities to facilitate transactions. For example, each SRC system 102 may be operated by, for example, a payment network (such as Mastercard International Incorporated or other network providers). Other entities may also operate SRC systems 102. Each SRC system 102 coordinates messages and transactions among transaction participants (including a Secure Remote Commerce Initiator (SRCI) 108 and a Digital Card Facilitator (DCF) which is not shown) in order to facilitate remote card payments pursuant to the present invention. A number of the messages and interactions facilitated by the SRC system 102 will be described by reference to transaction flows in FIGS. 5 and 6 discussed further below. While the SRC system 102, the SRCI 108 and the DCF are generally referred to herein as "participants" or "components" they may also be generally described as "roles". For example, the role of the DCF may be performed by an application that may be a part of a larger application that also performs the role of the SRCI 108.

The SRCI 108 in some embodiments is responsible for securely exchanging data with SRC system 102 (including providing checkout data to the SRC system 102). The SRCI 108 also securely receives payload information from the SRC system 102 for use in completing a payment transaction using that payload. In some embodiments, a number of SRCIs may be provided in a system 100. Each SRCI 108 may be operated, for example, by or on behalf of a merchant 112 (e.g., such as by a merchant service provider or the like).

Messages between the SRCI 108 and the SRC system 102 include SRC data and checkout data. This information may include, for example, profile data (including, for example DSA information), credentials to facilitate the secure exchange of data, consumer data (such as the consumer's email and mobile number), shipping information, transaction information and user device information. Other messages between the SRCI 108 and SRC system 102 include payload data which is created by the SRC system 102 and sent to the SRCI 108 to enable payment authorization to be performed. The payload data may include consumer information (such as, for example, email and phone number), information identifying the digital card selected for use in the transaction by the user, shipping address information, consumer verification response data, transaction information, etc. A confirmation API method may allow an SRCI 108 to notify the SRC 102 about the status or outcome of the transaction (and may include a transaction identifier as well as a status or status code).

An SRCI 108 may be, for example, a merchant, an acquirer, a payment gateway, or a payment service provider (PSP).

The functions enabled by a DCF may include, but are not limited to:
  On-boarding and integration with one or more SRC System(s) 102

Secure distribution of payment related data to the SRC System Enrolment of Digital Card credentials established by the Card Issuer Identification of a consumer and a consumer device to facilitate access to Cardholder data Verification of the relationship between the consumer and consumer device and providing related results Facilitation of the procurement of User Payment Data Secure exchange of data with the SRC System 102

Proper and secure storage and maintenance of Digital Card, User Personal Account Information (PAI) and Personally Identifiable Information (PII) data Secure distribution of value added service related data Support of required SRC ecosystem interactions and interfaces Digital Card Facilitator enablement may include either inline access directly to Card Issuer systems or maintenance of a container known as a digital wallet that stores data outside of a Card Issuer system and that is accessed through an established credential.

A DCF may be, for example, a payment network (such as Mastercard), a browser, an issuer, or a merchant.

Issuer 124 operates to enroll the consumer (also referred to herein as a "cardholder") and one or more payment account numbers (or "PANs") of the consumer. Acquirer 120 performs the standard payment function of performing authorisations of transactions involving payment accounts issued by that issuer 124. The system 100 typically comprises a plurality of acquirers 120 and issuers 124, though only one of each is depicted in FIG. 1.

The SRC system 102 and/or the other elements of the system 100 might be, for example, associated with a Personal Computer ("PC"), laptop computer, smartphone, an enterprise server, a server farm, and/or a database or similar storage devices. As used herein, devices, including those associated with the SRC system 102 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks. Note that the system 100 of FIG. 1 is provided only as an example, and embodiments may be associated with additional elements or components.

Figure 2:
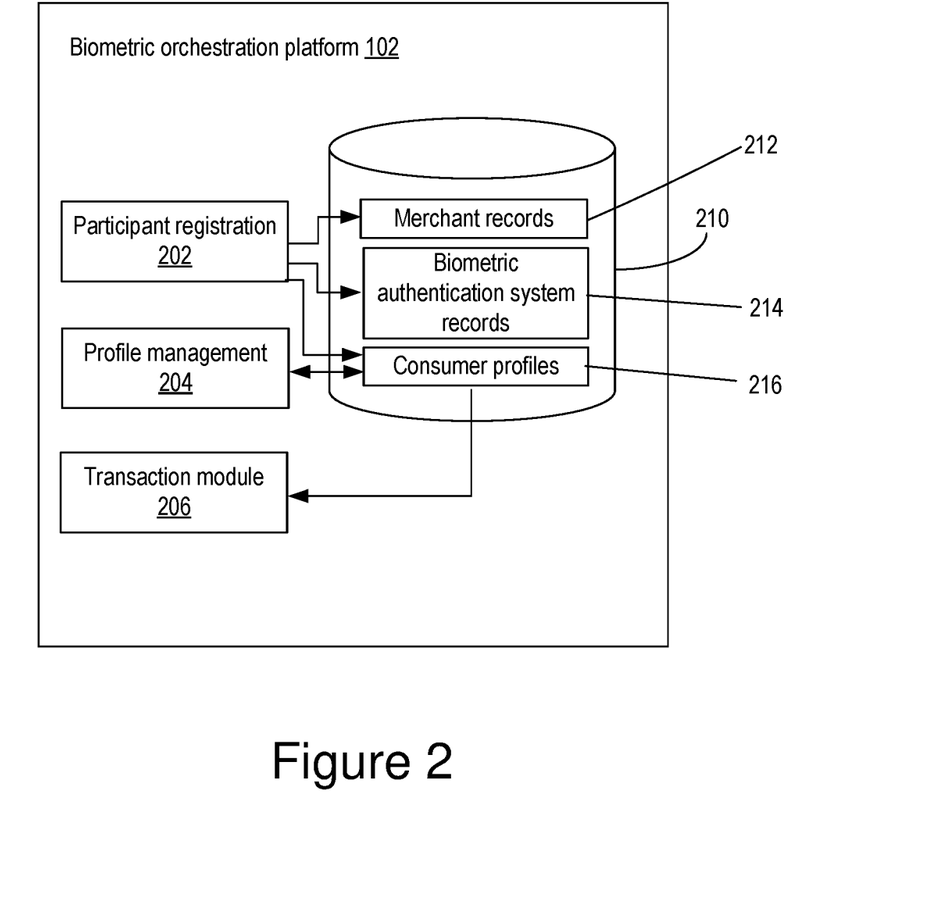
FIG. 2 is a block diagram showing an example architecture of a biometric orchestration platform of the system of FIG. 1.

Turning now to FIG. 2, an example architecture of a biometric orchestration platform 102 is shown in further detail. The biometric orchestration platform 102 comprises a data store 210 that stores records relating to system participants, including merchant records 212, biometric authentication system records 214, and consumer profiles 216.

The biometric orchestration platform 102 also comprises a number of functional modules for implementing features of certain embodiments. For example, the biometric orchestration platform 102 may comprise a participant registration module 202 that enables merchants 112 and biometric authentication systems 116 to be certified and/or registered with platform 102.

A certification and registration process for a biometric authentication system 116 may comprise the participant registration module 202 checking that the biometric authentication system 116 complies with biometric authentication standards, for example, one or more of the following:

Consumer's biometric data (e.g. face image) should not be stored on server

The generation/verification of biometric credential should be performed on edge devices No system should be able to use the biometric credential for generating the user's actual biometric data (e.g. face image)

2D Solution shall comply with False Match Ratio of less than 1 in 10,000

3D Solution shall comply with False Match Ratio of less than 1 in 100,000

False Non-Match Ratio should be less than 5% (this is a user convenience requirement)

Identification response time of less than 1 second

Verification response time of less than 1 second

Enrolment time is measured based on single image enrolment

Solution shall support anti-spoofing

Liveness detection is mandatory for certain kinds of biometric (e.g. facial, iris)

De-enrolment operations are in place (for privacy protection)

Once all of the certification requirements are met, the biometric authentication system 116 may be provided with an active record in participant data store 210 by participant registration module 202. The record may comprise a biometric authentication participant ID, and additional details such as the name of the provider of the biometric authentication system 116, details of the algorithm used by the biometric authentication system 116 (such as number and type of input features used for biometric authentication), and details of the format of the biometric identifier that is assigned by biometric authentication system 116.

The participant registration module 202 may also register a merchant 112 by obtaining details of the merchant, such as the merchant's name and address details, and one or more merchant identifiers assigned to the merchant by one or more payment networks (such as Mastercard). The participant registration module 202 may also receive a selection of a biometric authentication system 116 that is already certified and registered as a participant. For example, the merchant 112 or biometric authentication system 116 may provide the biometric authentication participant ID of the biometric authentication system 116 to the participant registration module 202 for writing to the merchant's profile in participant data store 210. The merchant profile stored in participant data store 210 may also comprise a merchant participant ID, such that the merchant participant ID is associated with the biometric authentication participant ID.

As mentioned above, biometric orchestration platform 102 may be (or may comprise) an SRC system, in which case consumer profiles 216 may be SRC profiles, and consumers can register accounts with the SRC system 102 in the usual way, with one or more payment cards then being associated with their SRC profile. This may be orchestrated by participant registration module 202.

Biometric orchestration platform 102 may further comprise a profile management module 204 that generally allows consumers with a registered consumer profile, such as an SRC profile, to manage the use of their biometric credentials by merchants in payment transactions. For example, consumers may interact with the profile management module 204 (e.g., via a web browser or mobile application) to access their consumer profile, view which merchants have previously been authorised to use biometric payments for particular payment cards, and either block individual cards entirely, or block access to specific merchants for individual cards. To this end, once changes are made to a consumer profile 216 at biometric orchestration platform 102, they may be propagated to any system participants where consumer profile data is stored, such as credential manager 108.

Biometric orchestration platform 102 may further comprise a transaction module 206 that generally operates to coordinate access to consumer profiles 216, and thus payment card data, during biometric transactions initiated by merchants 112. The transaction module 206 may also inject biometric-specific data elements into transaction messages that are passed between participants during a transaction, to enable greater control by issuers 124, as well as greater visibility to issuers 124 regarding which merchants are making use of biometric payments.

Figure 3:
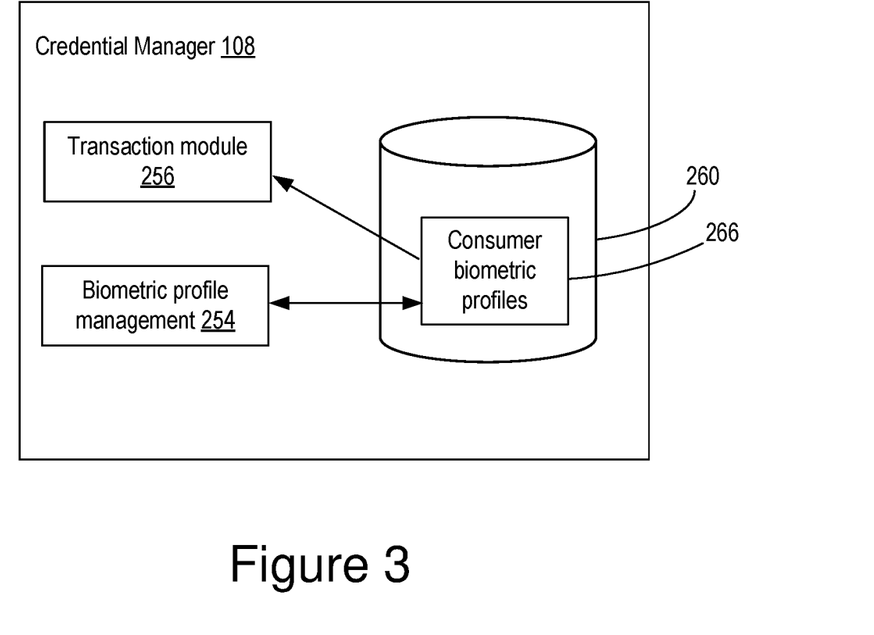
FIG. 3 is a block diagram showing an example architecture of a credential manager of the system of FIG. 1.

Turning now to FIG. 3, an example architecture of a credential manager system 108 is shown. The credential manager 108 comprises a credential store 260 storing consumer biometric profiles 266. Each consumer biometric profile may comprise a biometric identifier that was generated when the consumer registered for biometric payments via a merchant 112. The consumer biometric profile also comprises a payment credential that was provided by the consumer when registering for biometric payments. The payment credential may be a payment identifier such as the consumer's SRC profile ID, a payment card number, or a tokenised payment card number. Accordingly, each consumer biometric profile comprises an association of a merchant-specific biometric identifier and a payment credential (such as a payment identifier) for one or more merchants.

The credential manager 108 may comprise a biometric profile management module 254 that writes data to credential store 260 to create and/or update consumer biometric profiles 266 when consumers register with merchants 112 that are on-boarded with credential manager 108. The biometric profile management module 254 may also communicate with profile management module 204 of biometric orchestration platform 102, such that if a consumer edits his or her profile to change access permissions for one or more cards for one or more merchants as noted above, those changes are propagated to the consumer's biometric profile 266 in the credential store 260.

The credential manager 108 may further comprise a transaction module 256 that generally operates to obtain payment credentials (e.g., by retrieving them from credential store 260 or from biometric orchestration platform 102) and to assemble transaction authorisation request messages on behalf of merchants 112, for transmission to issuers 124 for approval.

Figure 4A:
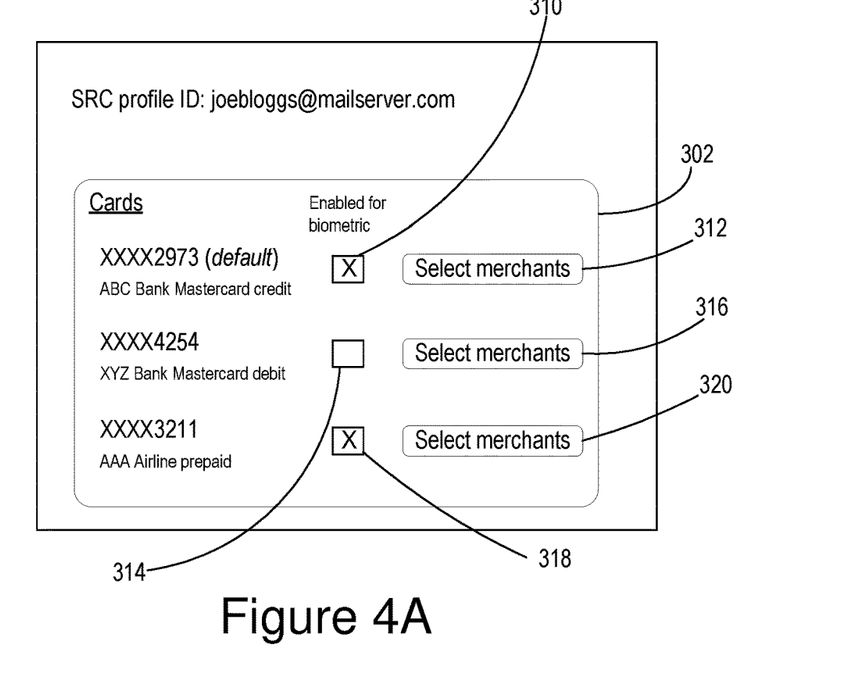
FIGS. 4A and 4B show an example user interface in a card management process implemented at least partly by the biometric orchestration platform.
Figure 4B:
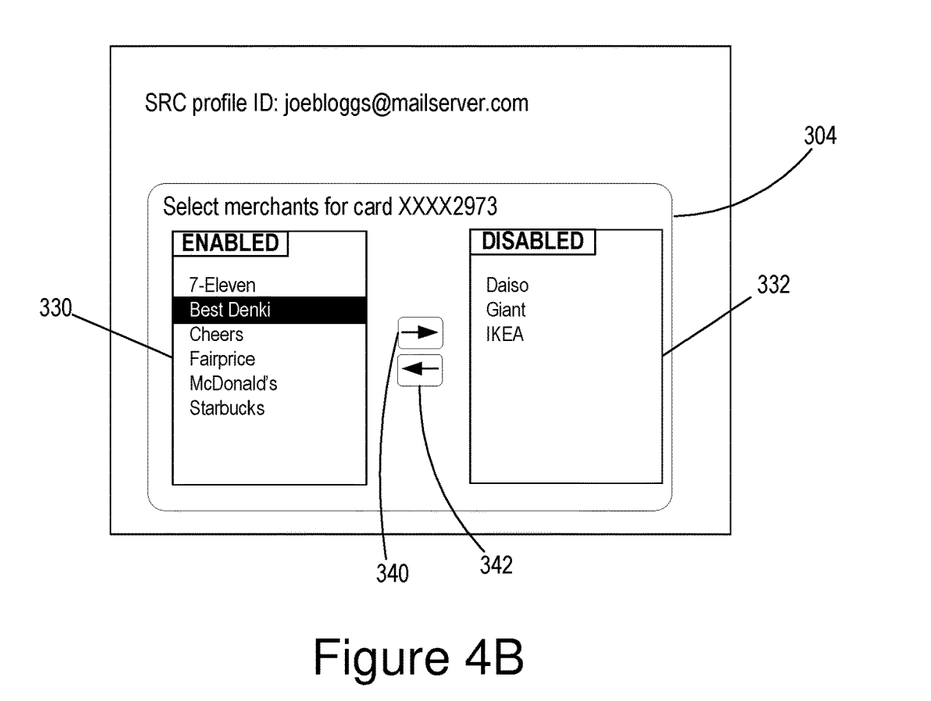

Referring now to FIGS. 4A and 4B, example user interfaces displayed during a profile management process implemented by profile management module 204 of biometric orchestration platform 102 are shown. FIG. 4A shows an example screen which displays the consumer's SRC profile ID (in this case, their email address). Also displayed in UI region 302 is a list of payment cards associated with the consumer's SRC profile, and an indication as to whether each card is enabled for biometric payments. Cards may be displayed with only the last 4 digits exposed, for security purposes.

Respective checkboxes (or other like GUI elements) 310, 314 or 318 may be used to enable or disable cards for biometric payments. For example, if the consumer wished to disable the card XXXX2973 entirely, checkbox 310 could be unchecked, this resulting in an update to consumer profile 216 (such as the writing of one or more flags) to indicate that XXXX2973 may not be used for biometric payments by any merchant. Accordingly, if a merchant 112 attempts to submit a biometric payment (such as a facial recognition payment) that uses XXXX2973, this may be blocked by credential manager 108, biometric orchestration platform 102, payment network 122 or issuer 124.

As shown in FIG. 4B, the consumer may control access to biometric payments for specific merchants. For example, the consumer may click, tap, or otherwise interact with a button control element 312 (in the UI region 302 of FIG. 4A) to modify the list 330 of merchants enabled for biometric payments with card XXXX2973 (or equivalently, buttons 316 and 320 for cards XXXX4254 and XXXX3211 respectively). In FIG. 4B, UI region 302 displays a first list 330 of merchants enabled for biometric payments for card XXXX2973, and a second list 332 of merchants that are disabled for use with that card. To disable the merchant "Best Denki", the consumer may select the entry for that merchant and click or tap right arrow control 340 to move it to the disabled list 332, such that a subsequent attempted transaction at Best Denki using biometric authentication (such as facial recognition) will be blocked (e.g. by any one of the entities mentioned above). On the other hand, if the consumer wished to enable the merchant "Daiso", they may click or tap on the corresponding entry in list 332 and click or tap on left arrow control 342 to move it to list 330.

In some embodiments, disabling a payment credential for biometric payments may cause the biometric orchestration platform 102 to transmit instructions to any credential managers 108 at which that payment credential is registered to not only delete it from the consumer's profile 266, but also to cause deletion of any corresponding biometric template data for the consumer, thus effectively permanently deregistering them from the corresponding merchant. This process may be coordinated by profile management module 204 and biometric profile management module 254, for example.

Merchants who appear in list 330 or list 332 will only be those for which the consumer has previously registered for biometric payments. Accordingly, if a consumer registers with a merchant for the first time, that merchant will be added to the enabled list 330 as part of the consumer's profile 216.

Figure 5A:
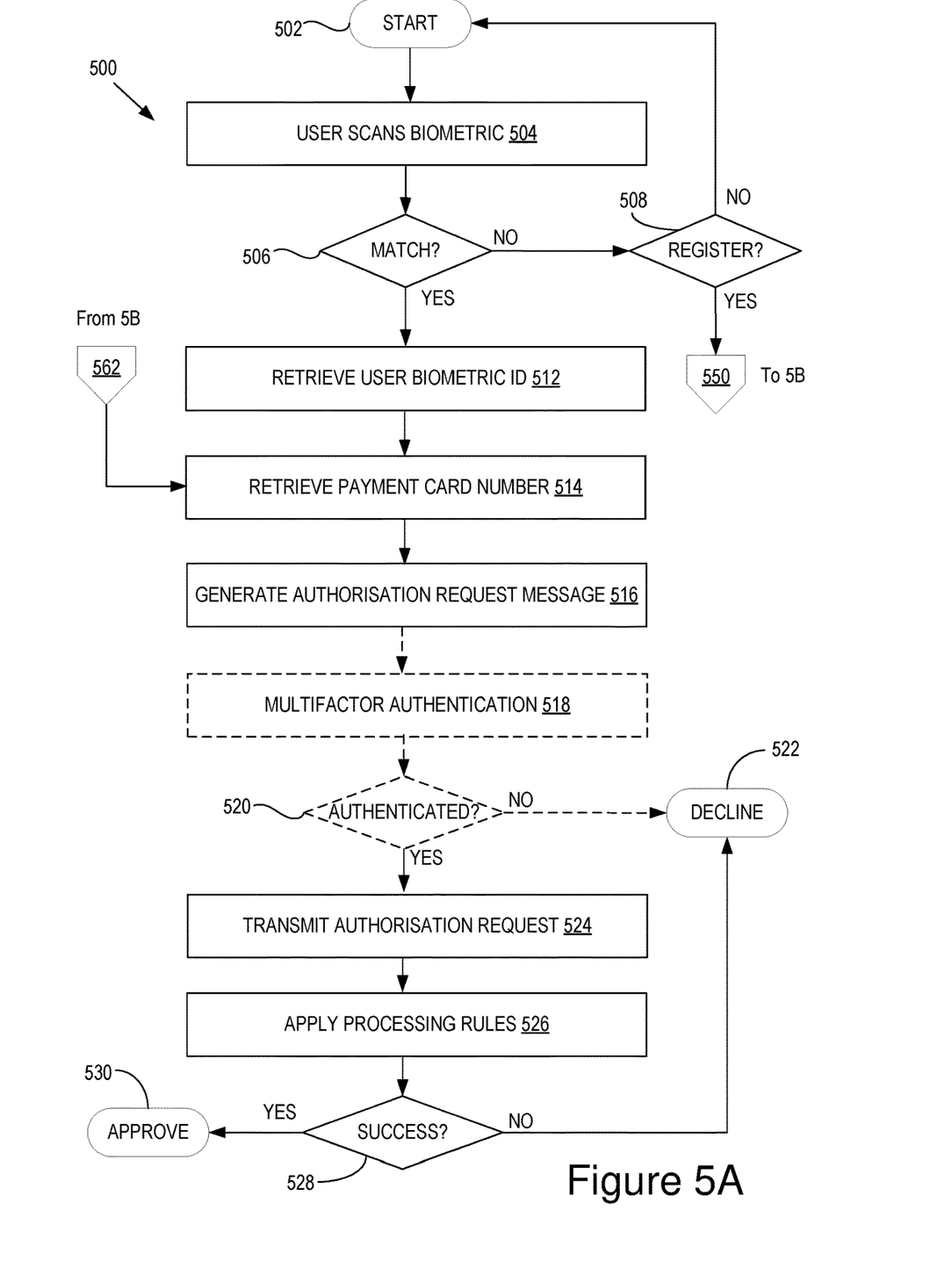
FIGS. 5A and 5B show a flow diagram of an example biometric payment process.
Figure 5B:
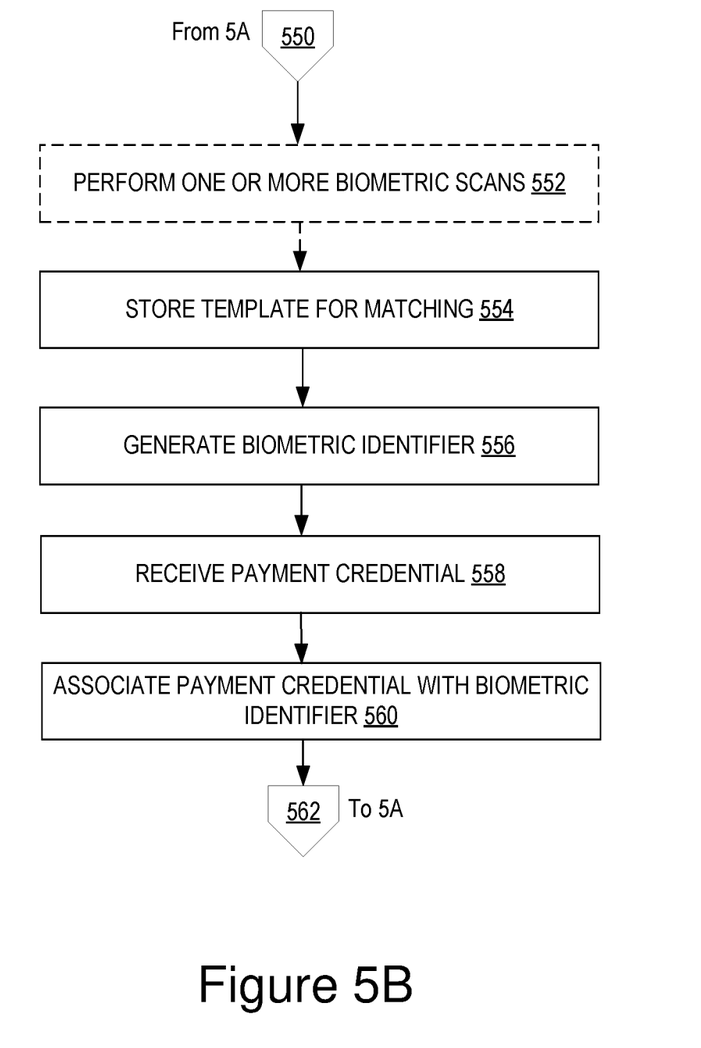

Reference is now made to FIGS. 5A and 5B which illustrate a method 500 that might be performed by some or all of the elements of the system 100 described with respect to FIGS. 1 to 3, or any other system, according to some embodiments of the present invention. The flow charts described herein do not imply a fixed order to the steps, and embodiments of the present invention may be practised in any order that is practicable. Note that any of the methods described herein may be performed by hardware, software, or any combination of these approaches. For example, a computer-readable storage medium may store thereon instructions that when executed by a machine result in performance according to any of the embodiments described herein.

Referring initially to FIG. 5A, a biometric payment process 500 may begin at block 502 with a merchant system 112 communicating with a biometric reader 114 to place it in a wait mode for receiving biometric scan data. The biometric reader 114 may have a display that indicates to a consumer that the transaction has been initiated and that the biometric reader 114 is ready to perform a scan to complete the transaction.

At block 504, the biometric reader 114 performs the scan. For example, the biometric reader 114 may scan the consumer's face using one or more cameras, and then generate a biometric template from the one or more scanned images of the consumer's face. In other embodiments, the biometric reader 114 may scan just part of the consumer's face (such as an iris or other part of the eye). In some embodiments, the biometric reader 114 may perform an alternative type of scan, such as a finger scan for fingerprint or vein recognition. The biometric template is generated according to an algorithm that is specified by the biometric authentication system 116 that communicates with the biometric reader 114. In this regard, any suitable template generation algorithm known to the skilled person may be used, and the process of template generation will not be described further herein.

At block 506, the biometric template is transmitted to the biometric authentication system 116. Biometric authentication system 116 searches a database of previously stored biometric templates to locate a match for the received biometric template. To this end, the biometric authentication system 116 may search only those biometric templates that have previously been registered with the merchant 112 from which the transaction was initiated, so as to reduce the search space. Any suitable matching algorithm may be used for comparison of the received biometric template to the stored biometric templates.

If no match is located, biometric authentication system 116 may return an error to biometric reader 114 or merchant 112. This may prompt a consumer registration decision at block 508. If the consumer opts not to register, for example because they are already aware that they have previously registered with the merchant, processing may return to block 502. Alternatively, a consumer registration flow may be triggered at block 550.

Turning to FIG. 5B, the consumer registration flow may optionally, at block 552, involve the biometric reader 114 performing one or more additional biometric scans, for example at different angles, or to capture different portions of the body part or body parts being scanned. Then, if not already generated, a biometric template may be generated for matching purposes. At block 554, the biometric template is stored, and a biometric identifier is generated at block 556. The biometric identifier is specific to merchant 112, and is stored in a database maintained by biometric authentication system 116, in association with the biometric template.

At block 558, a payment credential is entered by the consumer. This is typically via a user input of biometric reader 114, rather than at merchant system 112, such that the merchant system 112 is not exposed to the consumer's payment information. The payment credential may be a payment number, such as a payment card number (for a physical or virtual card), a tokenised payment card number, or another type of payment identifier such as a SRC profile ID (typically, an email address, or a phone number).

At block 560, the facial recognition system 116 receives the payment credential, and transmits it to credential manager 108. The credential manager 108 stores the payment credential in credential store 260 as part of the consumer's biometric profile 266, in association with the biometric identifier and merchant identifier. Importantly, neither the biometric authentication system 116 nor the merchant 112 store the consumer's payment credential. At block 562, processing returns to block 514 of the main transaction flow in FIG. 5A.

Returning to block 506 of FIG. 5A, if a match is located by the biometric authentication system 116, the method proceeds to block 512, where the corresponding biometric identifier is retrieved by the biometric authentication system 116.

At block 514, a payment card number (or tokenised payment card number) is determined for use in generating a transaction authorization request.

For example, if the payment number (e.g. payment card number or tokenised payment card number) was directly stored in credential store 260 as the payment credential, the biometric authentication system 116 may request that credential manager 108 retrieve the payment number, using the consumer's biometric identifier, from credential store 260. The credential manager 108 may then act as a payment service provider (PSP) that generates (block 516) an authorization request message for transmission to the issuer 124 of the payment card. Alternatively, the credential manager 108 may pass the payment number to an external PSP for generation and transmission of the authorization request message. The authorization request message comprises the payment number, and other transaction-related information, e.g. a transaction amount (and other information) received from merchant 112, timestamp, and merchant ID. Alternatively, the credential manager 108 may transmit the payment number and other transaction-related information to a PSP for generation of the authorization request message.

In another example, if the consumer profile 266 in credential store 260 contains a SRC profile ID, credential manager 108 may act as an SRC initiator in an SRC framework, and may thus request card information for the consumer from an SRC system, such as biometric authentication platform 102. The card information may be retrieved from an SRC profile 216 stored at the biometric authentication platform 102, based on the SRC profile ID, and may comprise a list of cards (with a PAN or token for each), each card being associated with metadata that indicates whether the card is usable for biometric payments, and if so, for which merchants; and whether the card is a default card, either for SRC transactions generally, or for biometric-based payments. A card is selected from the list. Typically, the selection is on the basis that it is the default card. In some embodiments, it may be possible to enable manual user selection, for example by displaying a list of cards (e.g. identified by only the last 4 digits) at the merchant terminal. In other embodiments, the merchant terminal may display the default card, with the user then acknowledging the selection of the default card. An optional field may be provided on the merchant terminal, with an option for the user to select another payment credential (if applicable). This may be beneficial where the terminal is part of a self-service station such as a kiosk, for example. Card data is returned by the biometric orchestration platform 102 as part of an SRC payload. The card data is then used to form the authentication request message as above.

In each of the above examples, one or more non-standard data elements are injected into the authorization request message at block 516, for example by the credential manager 108 acting as PSP or SRCI. The one or more non-standard data elements comprise a biometric data element that carries information relating to the biometric authentication process that was used to identify the consumer during the transaction. For example, the biometric data element may comprise one or more of the following: an indication that the transaction used biometric authentication; the biometric identifier of the consumer; the type of biometric authentication that was used; an identifier of the provider of the biometric authentication system 116; and details of the biometric authentication algorithm that was used.

Advantageously, the inclusion of the biometric data element may provide finer control over transaction approvals by issuers 124. For example, by detecting that biometric authentication was used, issuers 124 may be able to use less stringent, and thus more efficient, fraud management processing without compromising security. A further benefit to issuers 124 is that they are able to see which merchants are using biometric authentication, and to what extent they are using it.

Optionally, the process 500 may employ multifactor authentication (MFA), as shown at blocks 518 and 520. MFA improves the overall security of the process 500 by requiring a further, out-of-band, authentication by the consumer. For example, at block 518 credential manager 108 may send a request to an issuer 124 of the selected payment card for 3D Secure verification. The issuer 124 may then transmit a verification request to the consumer via a previously agreed channel, such as a mobile banking application, a mobile phone number provided by the consumer when creating the account, or an email address. Typically this will be via the consumer's mobile device 104 (FIG. 1). The consumer then enters a verification response, such as a one-time passcode, and transmits this to the issuer 124 for verification that the received response is the expected response. The issuer 124 then reports the results of the verification to credential manager 108.

If the verification failed, the transaction may be declined (at block 522), or the issuer 124 may provide the consumer with a further opportunity (not shown) to enter a verification response, prior to reporting the result to the credential manager 108.

If the verification succeeded, or if no MFA was performed, the credential manager 108 (or a PSP acting on behalf of the credential manager 108) may transmit the authorization request message to the issuer 124 for approval, at block 524. The authorization request message reaches the issuer 124 in conventional fashion, by the merchant's 112 or PSP's acquirer 120 routing the message to payment network 122, which in turn routes it to issuer 124 for approval.

At block 526, the authorization request message is processed, using one or more processing rules, to determine whether to approve or decline the transaction. The one or more processing rules are applied by issuer 124, including conventional rules such as checking that there is a sufficient account balance to cover the transaction amount. The issuer 124 or a processor acting on behalf of the issuer 124 may also apply one or more processing rules, such as fraud management rules, to the authorization request message. One or more processing rules can also be applied at one or more other parts of the system 100, such as acquirer 120 or payment network 122, or another system that communicates with credential manager 108.

In one example, a card controls module may execute at payment network 122, and may analyze the authorization request message to determine whether it has a biometric data element that has been populated. If so, the card controls module may communicate with biometric orchestration platform 102 to determine, at block 528, whether the payment card number or token is enabled for biometric payments with the merchant identified in the authorization request message. In some implementations, a token may have been de-authorized (and thus no longer capable of being used for payment) after it is provisioned, and the card controls module may also check for this. If the card is not enabled, the transaction may be declined, and a decline message may be routed from the payment network 122 to the credential manager 108 and finally the merchant 112, at block 522.

If it is determined that the card is enabled for biometric payments with the identified merchant, then the transaction authorization message may be routed to the issuer 124 for application of further processing rules, such as the standard balance check and fraud management checks mentioned above. If all rules are satisfied, an approval message is routed back to the merchant 112, at block 530.

In another example, the card controls module may instead execute at issuer 124. Issuer 124 may in that case communicate with the biometric orchestration platform 102 to determine whether the card is able to be used for biometric payments, and decline the transaction if it is not (or if the authorization request message fails to satisfy one or more other processing rules).

Figure 6:
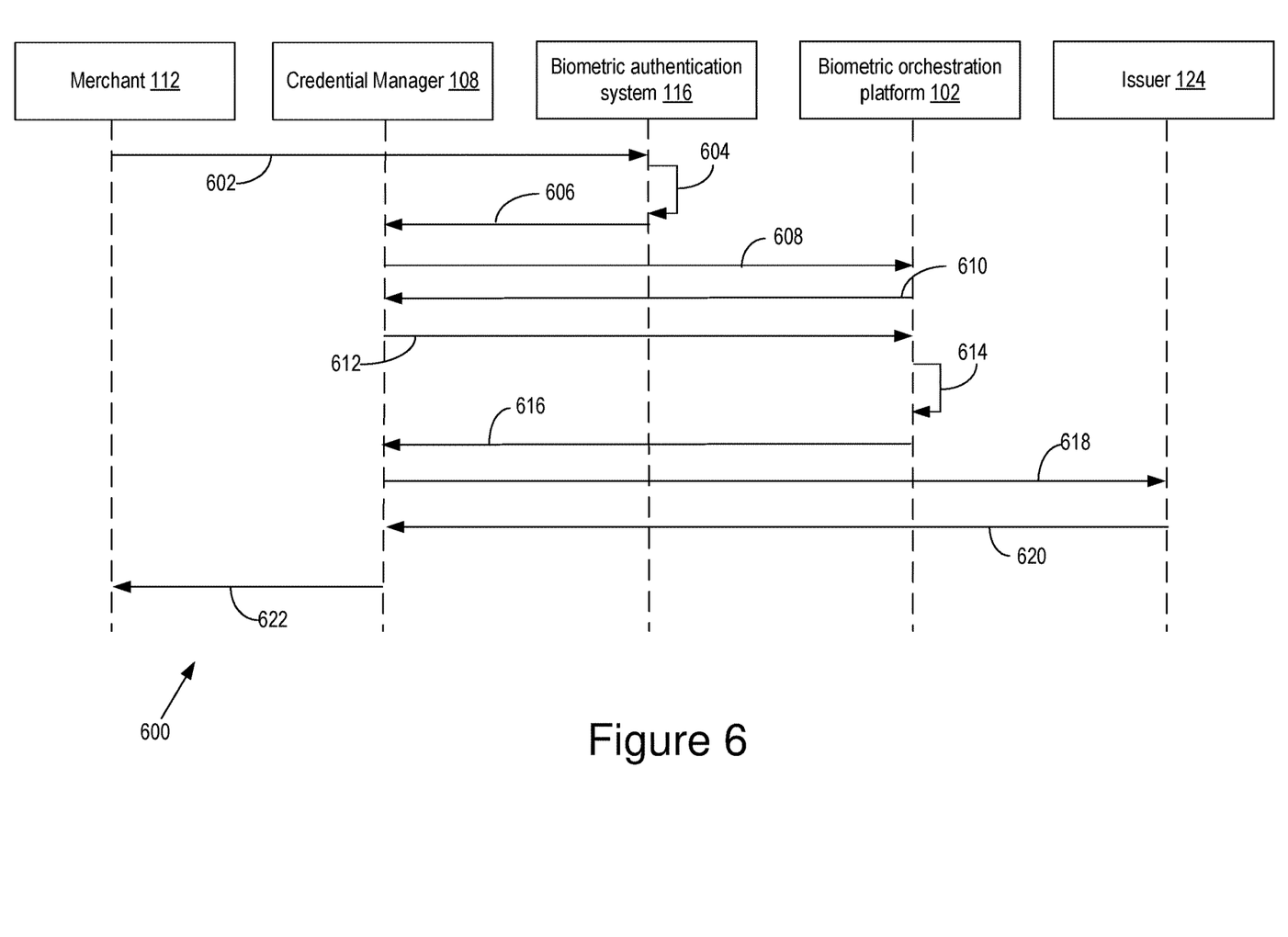
FIG. 6 is a sequence diagram of certain messaging flows in the biometric payment process of FIGS. 5A and 5B.

FIG. 6 shows a sequence diagram of an example messaging flow 600 which is part of a biometric payment process according to certain embodiments, in which the process is implemented in an SRC framework. Accordingly, in FIG. 6 it is assumed that the consumer's biometric identifier is stored in association with an SRC profile ID at the credential store 260.

Initially, the merchant 112, via a biometric reader 114 that captures biometric data of a consumer interacting with the biometric reader 114 in-store, sends a user recognition request 602 to the biometric authentication system 116. The user recognition request comprises image data (or other sensor data) captured by the biometric reader 114, or a biometric template derived from same.

Next, the biometric authentication system 116 matches 604 the received image or biometric template to stored biometric template data to retrieve the biometric identifier of the consumer. This is returned to the merchant 112.

The merchant 112 then sends a request 606 to credential manager 108, acting as an SRCI, to initialize an SRC checkout process. The request 606 comprises the biometric identifier. Accordingly, the credential manager 108 is able to retrieve the associated SRC profile ID, using the biometric identifier, from credential store 260. The request also comprises transaction related information generated by the merchant 112, including a merchant ID and transaction amount, possibly together with other transaction-specific information that is routinely transmitted as part of authorization requests in payment systems. In some embodiments, the merchant 112 may pass the transaction related information to the biometric authentication system 116 to send the request 606 to the SRCI.

Credential manager 108 then sends a request 608 to the biometric orchestration platform 102, acting as an SRC system, to retrieve the SRC profile of the consumer recognized by biometric authentication system 116. The request 608 comprises the SRC profile ID of the consumer.

SRC system 102 retrieves the consumer's SRC profile using the SRC profile ID, and transmits a message 610 comprising a list of cards associated with the consumer's SRC profile. The message comprises metadata relating to the cards in the list, such as an indication as to whether or not respective cards have been approved for biometric payments. Each card in the list may be identified in abbreviated form, such as by the last 4 digits of the PAN or token for the card.

Next, credential manager 108 receives the list of cards and metadata, and sends a request 612 for card data (such as the full PAN or token) that is required to complete SRC checkout. The request 612 comprises an identifier of the default card in the list received from the SRC system 102, such as the last 4 digits of the PAN or token as noted above. Credential manager 108 may also determine the biometric identifier corresponding to the default card, and the biometric authentication participant ID of the facial recognition system 116, and transmit these as part of request 612.

SRC system 102 receives the request 612 for the default card, and as a security measure, may validate 614 the biometric identifier transmitted with the request 612. For example, ID format data for the biometric authentication provider corresponding to the received biometric authentication participant ID may be retrieved from participant database 210, and compared against the received biometric identifier. If the format of the biometric identifier does not match, SRC system 102 may return an error to credential manager 108, and the process 600 may terminate. In some embodiments, this validation step may instead be performed by merchant 112, in cooperation with credential manager 108.

If the format validation operation 614 is successful, or is not performed, the SRC system 102 may return an SRC payload comprising the card data for the default card to credential manager 108, at 616. The SRC system 102 may add the biometric data element to the SRC payload.

Optionally, once the SRC payload is available, credential manager 108 may implement a MFA process, for example by sending a 3D Secure initiation request 618 to issuer 124. Issuer 124 may receive the request and transmit a challenge to the consumer's mobile device 104 as noted above. On a successful response to the challenge, an acknowledgement 620 is transmitted to the credential manager 108.

Once the SRC payload with the card data is received, the credential manager 108 can complete SRC checkout, and send a transaction completion message 622 to the merchant 112. To complete the checkout, the credential manager 108 uses the information in the SRC payload to form an authorization request message, or to cause a PSP to form the authorization request message, as noted above.

Figure 7:
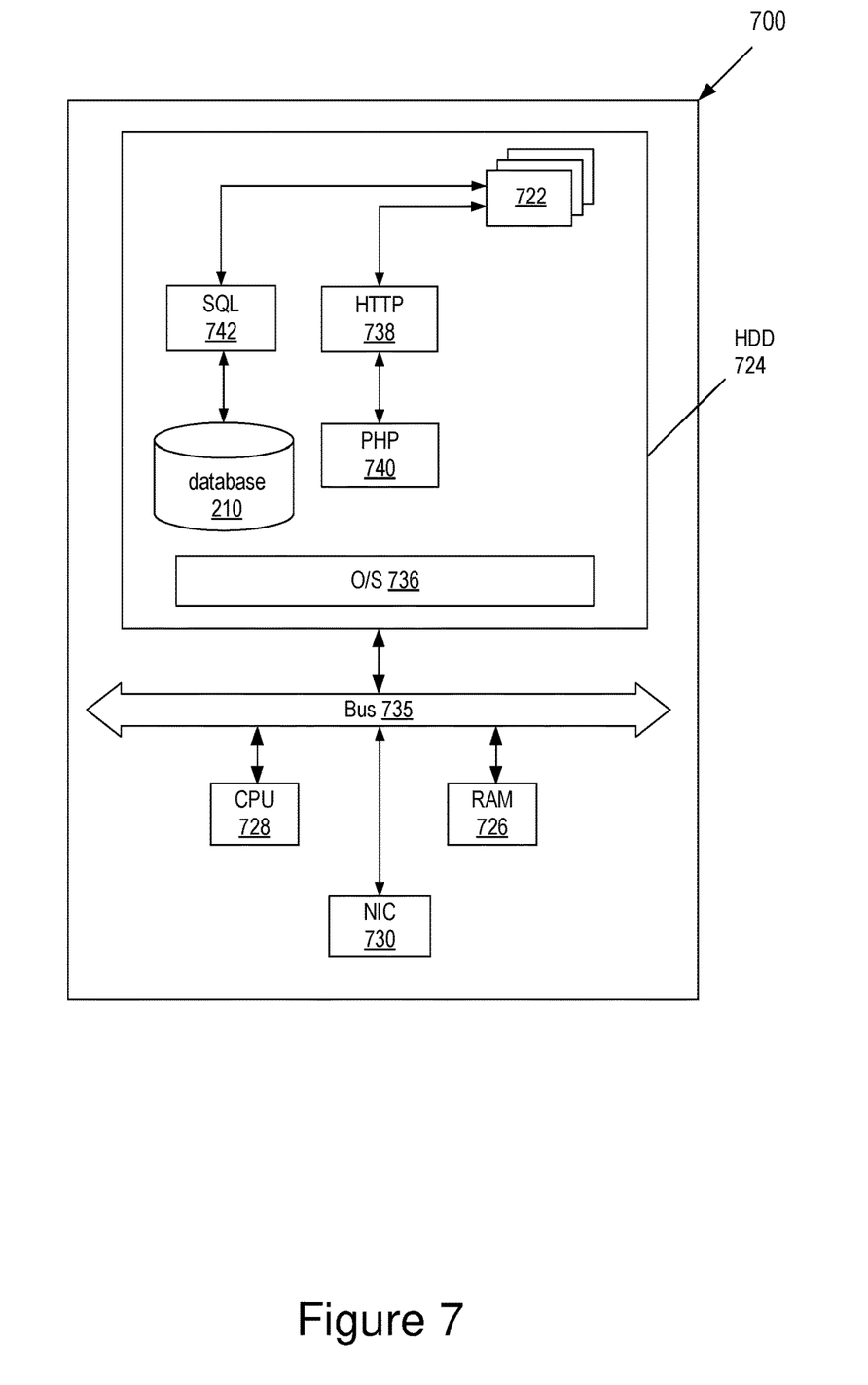
FIG. 7 is an example architecture of a computing apparatus for implementing some embodiments of the invention.

FIG. 7 shows an example computing device 700 that is capable of implementing a biometric orchestration platform 102 (or at least part thereof).

The components of the computing device 700 can be configured in a variety of ways. The components can be implemented entirely by software to be executed on standard computer server hardware, which may comprise one hardware unit or different computer hardware units distributed over various locations, which may communicate over a network. Some of the components or parts thereof may also be implemented by application specific integrated circuits (ASICs) or field programmable gate arrays.

In the example shown in FIG. 7, the computing device 700 is a commercially available server computer system based on a 32 bit or a 64 bit Intel architecture, and the processes and/or methods executed or performed by the computing device 120 are implemented in the form of programming instructions of one or more software components or modules 722 stored on non-volatile (e.g., hard disk) computer-readable storage 724 associated with the computing device 700. At least parts of the software modules 722 could alternatively be implemented as one or more dedicated hardware components, such as application-specific integrated circuits (ASICs) and/or field programmable gate arrays (FPGAs).

The computing device 700 includes at least one or more of the following standard, commercially available, computer components, all interconnected by a bus 735:
  (a) random access memory (RAM) 726;
  (b) at least one computer processor 728, and
  (c) a network interface connector (NIC) 730 which connects the computer device 700 to a data communications network and/or to external devices.

The computing device 700 includes a plurality of standard software modules, including:
  (a) an operating system (OS) 736 (e.g., Linux or Microsoft Windows);
  (b) web server software 738 such as Apache, available at http://www.apache.org;
  (c) scripting language support 740 such as PHP, available at http://www.php.net, or Microsoft ASP; and
  (d) structured query language (SQL) modules 742 (e.g., MySQL, available from http://www.mysql.com), which allow data to be stored in and retrieved/accessed from an SQL database 210, for example in order for consumers to update their profiles 216 to enable or disable access by merchants to biometric payments using cards of the consumers.

Advantageously, the database 210 forms part of the computer readable data storage 724. Alternatively, the database 716 is located remote from the computing device 700 shown in FIG. 7.

The boundaries between the modules and components in the software modules 722 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of those parts of the processes 500 and 600 performed by the biometric orchestration platform 102 may be executed by a module (of software modules 722) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module. The modules 722 may comprise, for example, the participant registration module 202, profile management module 204, and transaction module 206.

The computing device 700 normally processes information according to a program (a list of internally stored instructions such as a particular application program and/or an operating system) and produces resultant output information via input/output (I/O) devices 730. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method for biometric payments, comprising:
   receiving user input of biometric data from a user in-person at an interface of a biometric reader device at a merchant to register the user for biometric payments at the merchant based upon the biometric data wherein the user input of the biometric data at the biometric reader device includes the user inputting user image data through a scanning operation;
   based upon the registration at the merchant, generating and storing, at a credential manager, a biometric identifier associated with the user including the biometric data of the user;
   after registration, receiving biometric data by the biometric reader device from the user during an in-person sale transaction with the user at the merchant, wherein, if the user is registered for biometric payments with the merchant and the biometric payments for the merchant have not been disabled by the user:
      determining the biometric identifier that is associated with the biometric data at the credential manager;
      determining a stored payment credential that is associated with the biometric identifier stored at the credential manager, wherein the stored payment credential is stored by the credential manager that is in communication with the merchant, wherein the stored payment credential includes a secure remote commerce (SRC) profile identifier such that the credential manager operates as an SRC initiator;
      determining a payment number based on the stored payment credential by:
         transmitting a request to a biometric orchestration system for the payment number from the credential manager based on the secure remote commerce (SRC) profile identifier and the biometric identifier, the biometric orchestration system comprising a computer processor to control operations;
         retrieving by the biometric orchestration system, under the control of the computer processor, a default card associated with the SRC profile identifier and the payment number for the default card, if the biometric identifier is validated by the biometric orchestration system for the default card, wherein the payment number comprises at least one of a payment card number or a tokenised payment card number; and
         transmitting by the biometric orchestration system to the credential manager, under the control of the computer processor, the payment number for the default card;
   generating an authorisation request message at the credential manager that is transmitted to an issuer for processing by the issuer, wherein the authorisation request message comprises the payment number to complete the in-person sale transaction, and a data element comprising an indication that the user was authenticated by a biometric authentication method;
   after registration, receiving a user request from the user at the biometric orchestration system to enable or disable biometric payments by the default card for one or more specific merchants, wherein the user request to enable biometric payments by the default card for the one or more the specific merchants is based upon the user checking an enablement box on a display and selecting an icon of the specific merchant on the display associated with the enablement box for enablement, wherein the user request to disable biometric payments by the default card for the specific merchant is based upon the user selecting an icon of the specific merchant on the display for disablement; and
   selectively enabling or disabling biometric payments by the default card for the specific merchant at the biometric orchestration system responsive to the user request.

2. The method according to claim 1, wherein the biometric data is facial scan data.

3. The method according to claim 1, wherein the data element is injected in an SRC payload prior to generating the authorisation request message.

4. The method according to claim 1, comprising enrolling a biometric authentication system associated with the biometric reader device.

5. The method according to claim 4, wherein the biometric authentication system is enrolled responsive to a determination that the biometric authentication system complies with one or more requirements of a biometric authentication standard.

6. The method according to claim 4, comprising storing an association of the biometric authentication system with the merchant.

7. The method according to claim 1, comprising validating a format of the biometric identifier; and terminating the biometric payment if the format is not successfully validated.

8. A method for biometric payments, comprising:
   receiving user input of biometric data from a user in-person at an interface of a biometric reader device at a merchant to register the user for biometric payments at the merchant based upon the biometric data wherein the user input of the biometric data at the biometric reader device includes the user inputting user image data through a scanning operation;
   based upon the registration at the merchant, generating and storing, at a credential manager, a biometric identifier associated with the user including the biometric data of the user;
   after registration, receiving, at a credential store of the credential manager from the merchant, a request to perform a biometric payment, the request comprising the biometric identifier of the user determined from biometric data obtained by the biometric reader device from the user during an in-person sale transaction by the user at the merchant;

if biometric payments for the merchant have not been disabled by the user, determining, at the credential store, the stored payment credential that is associated with the biometric identifier, wherein the stored payment credential is stored by the credential manager that is in communication with the merchant, wherein the stored payment credential is a secure remote commerce (SRC) profile identifier such that the credential manager operates as an SRC initiator;

determining a payment number based on the stored payment credential by:
transmitting, to a biometric orchestration system, a request to the biometric orchestration system for the payment number from the credential manager based on the secure remote commerce (SRC) profile identifier and the biometric identifier, the biometric orchestration system comprising a computer processor to control operations;
retrieving by the biometric orchestration system, under the control of the computer processor, a default card associated with the SRC profile identifier and the payment number for the default card, if the biometric identifier is validated by the biometric orchestration system for the default card, wherein the payment number comprises at least one of a payment card number or a tokenised payment card number; and
transmitting by the biometric orchestration system to the credential manager, under the control of the computer processor, the payment number for the default card; and generating an authorisation request message at the credential manager that is transmitted to an issuer for processing by the issuer, wherein the authorisation request message comprises the payment number to complete the in-person sale transaction, and a data element comprising an indication that the user was authenticated by a biometric authentication method;

after registration, receiving a user request from the user at the biometric orchestration system to enable or disable biometric payments by the default card for one or more specific merchants, wherein the user request to enable biometric payments by the default card for the one or more the specific merchants is based upon the user checking an enablement box on a display and selecting an icon of the specific merchant on the display associated with the enablement box for enablement, wherein the user request to disable biometric payments by the default card for the specific merchant is based upon the user selecting an icon of the specific merchant on the display for disablement; and selectively enabling or disabling biometric payments by the default card for the specific merchant at the biometric orchestration system responsive to the user request.

9. The method according to claim 8, wherein the biometric data is facial scan data.

10. The method according to claim 8, comprising requesting an issuer of the determined payment number to initiate a multifactor authentication process.

11. A system for biometric payments, comprising:
memory; and
at least one processor;
wherein the memory stores instructions for causing the at least one processor to:
receive a payment credential for a user from a merchant, wherein, the payment credential is based upon the user registering in-person at the merchant, wherein, the user inputs biometric data at an interface of a biometric reader device at the merchant to register the user for biometric payments at the merchant based upon the biometric data, wherein the user input of the biometric data at the biometric reader device includes the user inputting user image data through a scanning operation, and based upon the registration at the merchant, a biometric identifier associated with the user including the biometric data of the user is stored at a credential manager:

after registration, receive biometric data obtained by the biometric reader device from the user during an in-person sale transaction with the user at the merchant, wherein if the user is registered for biometric payments with the merchant, and the biometric payments for the merchant have not been disabled by the user:

determine the biometric identifier that is associated with the biometric data;

determine a stored payment credential that is associated with the biometric identifier stored at the credential manager, wherein the stored payment credential is stored by the credential manager that is in communication with the merchant, wherein the stored payment credential includes a secure remote commerce (SRC) profile identifier such that the credential manager operates as an SRC initiator;

determine a payment number based on the stored payment credential by:
transmitting a request to a biometric orchestration system for the payment number from the credential manager based on the secure remote commerce (SRC) profile identifier and the biometric identifier;
retrieving by the biometric orchestration system a default card associated with the SRC profile identifier and the payment number for the default card, if the biometric identifier is validated by the biometric orchestration system for the default card, wherein the payment number comprises at least one of a payment card number or a tokenised payment card number; and
transmitting by the biometric orchestration system to the credential manager the payment number for the default card;

generate an authorisation request message at the credential manager that is transmitted to an issuer for processing by the issuer, wherein the authorisation request message comprises the payment number to complete the in-person sale transaction, and a data element comprising an indication that the user was authenticated by a biometric authentication method;

after registration, receiving a user request from the user at the biometric orchestration system to enable or disable biometric payments by the default card for one or more specific merchants, wherein the user request to enable biometric payments by the default card for the one or more the specific merchants is based upon the user checking an enablement box on a display and selecting an icon of the specific merchant on the display associated with the enablement box for enablement, wherein the user request to disable biometric payments by the default card for the specific merchant is based upon the user selecting an icon of the specific merchant on the display for disablement; and selectively enabling or disabling biometric payments by the default card for the specific merchant at the biometric orchestration system responsive to the user request.

* * * * *